Dec. 6, 1955   R. ASHTON ET AL   2,725,706
WINDROWER FRAME AND DRIVE MEANS
Original Filed Feb. 3, 1954   6 Sheets-Sheet 2

INVENTORS
ROBERT ASHTON
THOMAS CARROLL
BY James E. Nilles
Attorney

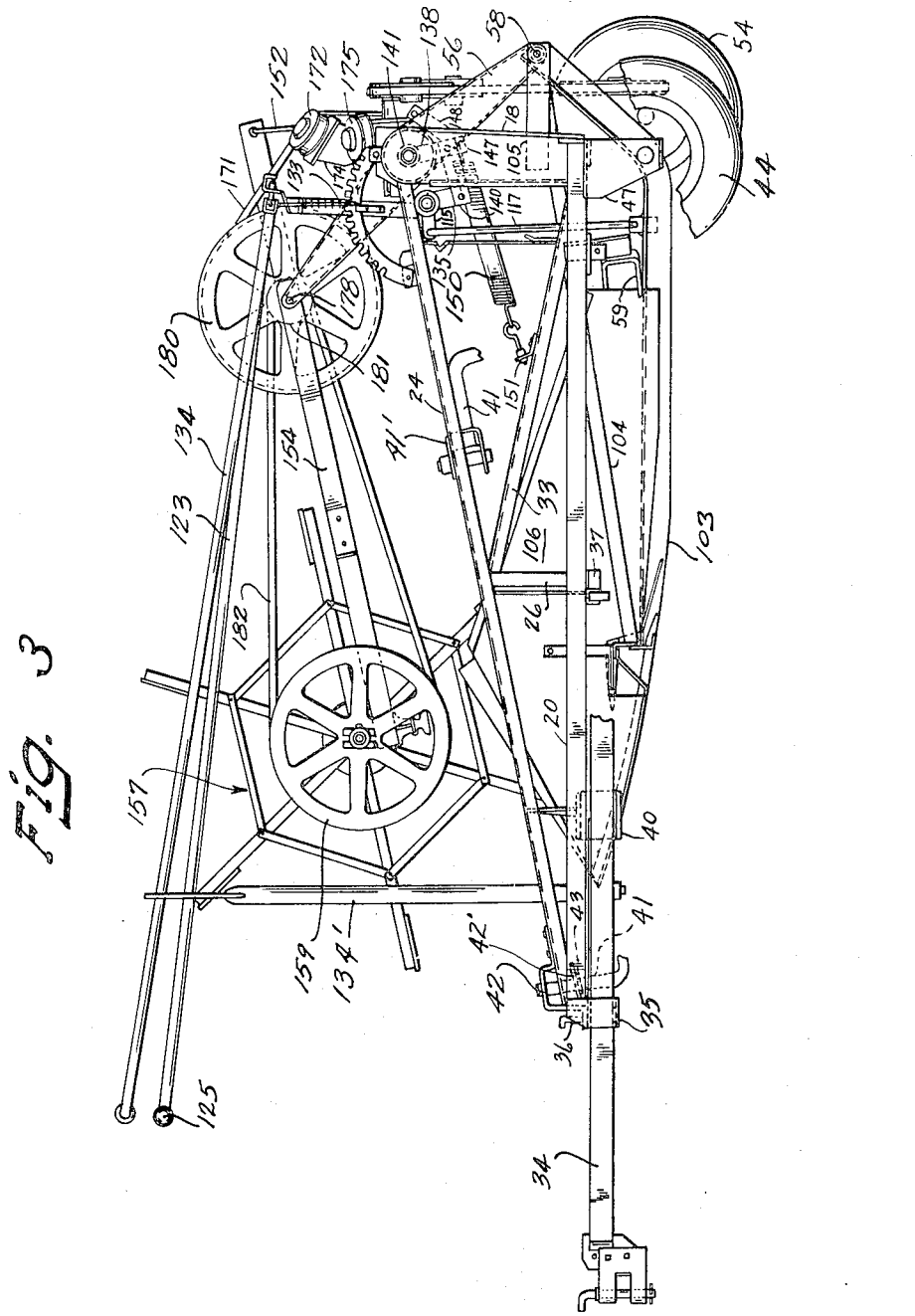

Dec. 6, 1955 R. ASHTON ET AL 2,725,706
WINDROWER FRAME AND DRIVE MEANS
Original Filed Feb. 3, 1954 6 Sheets-Sheet 4
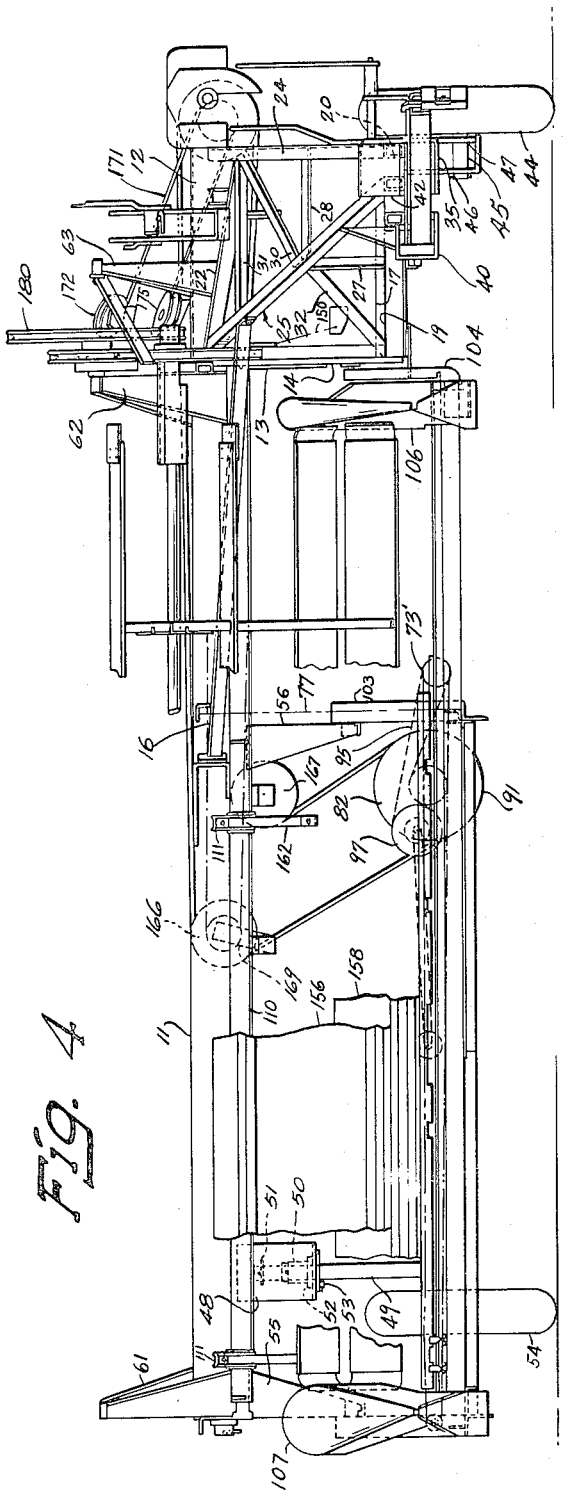
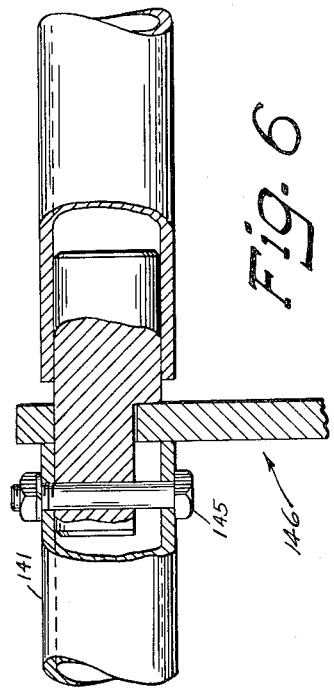
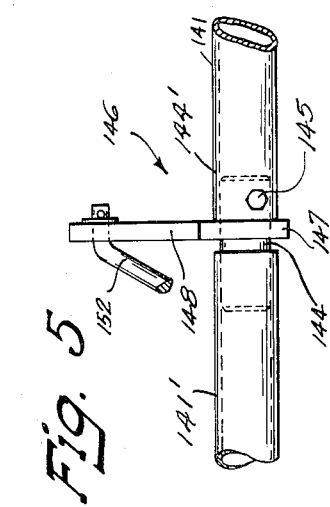
INVENTORS
ROBERT ASHTON
THOMAS CARROLL
BY
James E. Nilles
Attorney Dec. 6, 1955   R. ASHTON ET AL   2,725,706
WINDROWER FRAME AND DRIVE MEANS
Original Filed Feb. 3, 1954   6 Sheets-Sheet 5
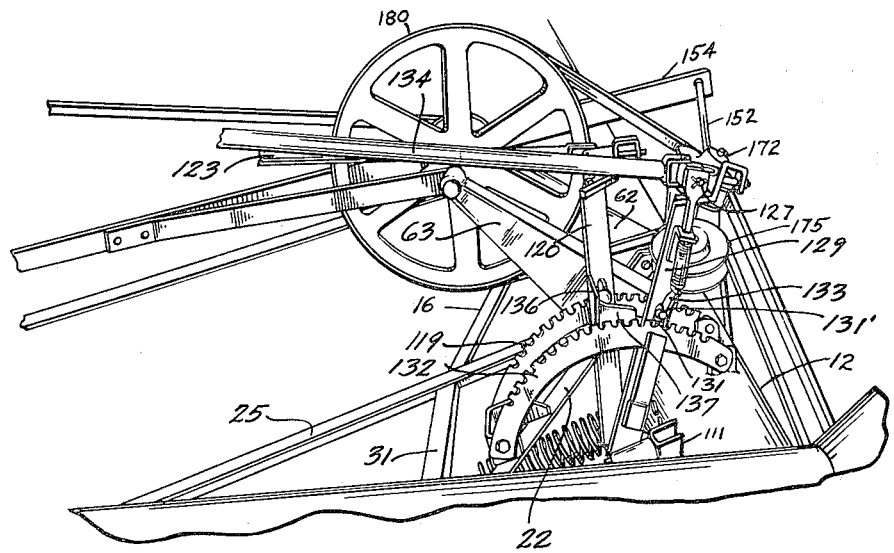
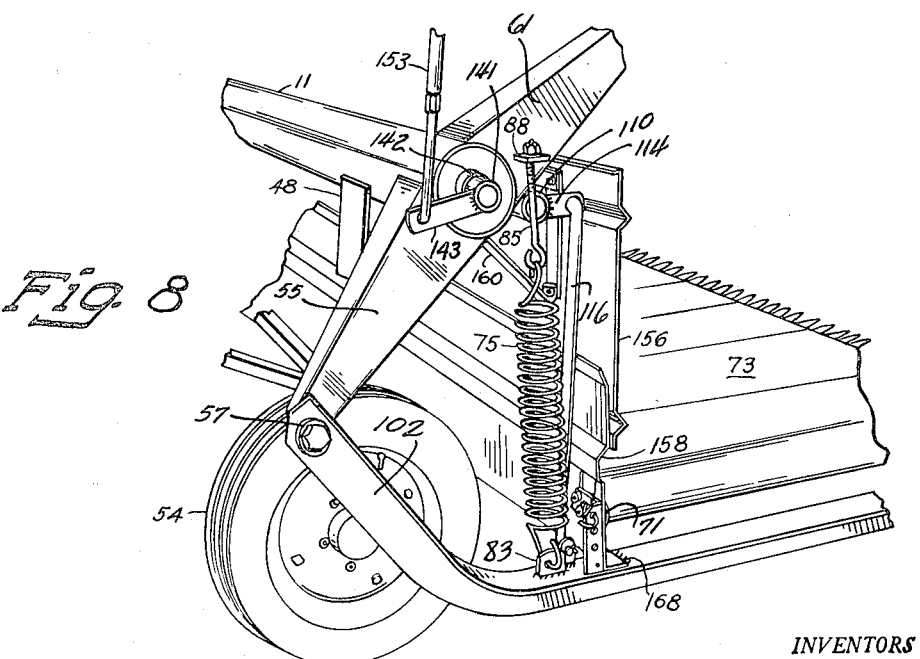
INVENTORS
ROBERT ASHTON
THOMAS CARROLL
BY
James E. Nilles
Attorney

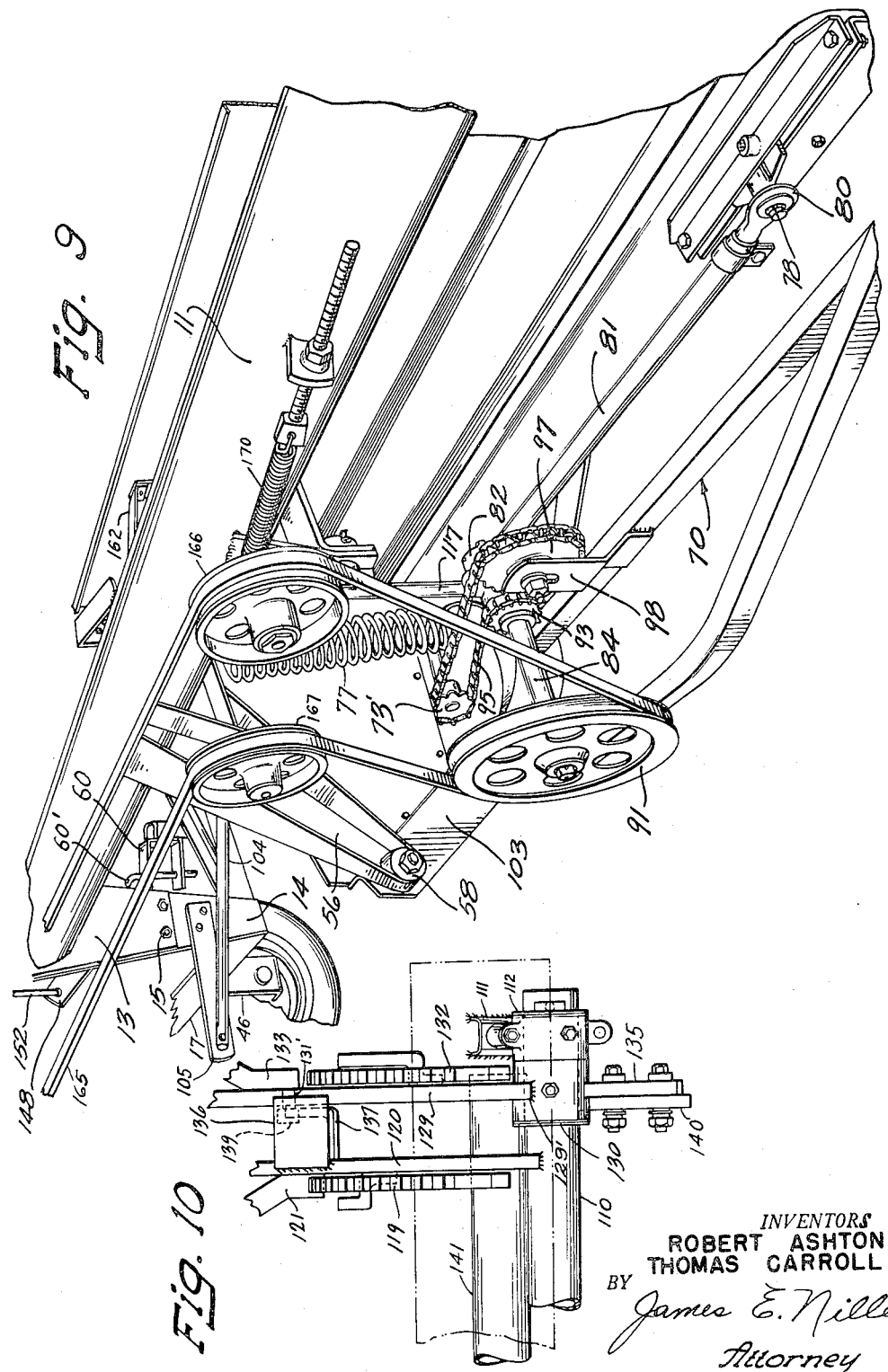

United States Patent Office 2,725,706
Patented Dec. 6, 1955

2,725,706

WINDROWER FRAME AND DRIVE MEANS

Robert Ashton and Thomas Carroll, Toronto, Ontario, Canada, assignors to Massey-Harris-Ferguson Limited, a corporation of Canada Original application February 3, 1954, Serial No. 334,782. Divided and this application November 6, 1953, Serial No. 390,680

4 Claims. (Cl. 56—192)

This invention relates to harvesting machines of the type generally known as windrowers or swathers.

This application is a divisional of our application filed February 3, 1953, Serial Number 334,782, for "Windrower," now Patent No. 2,720,744, issued October 18, 1955.

In a machine of this type it is necessary to be able to quickly and easily adjust the height of the table relative to the ground to accommodate the varying crop conditions throughout the field. In as much as this adjustment is usually made manually by the operator and must be made frequently and quickly, it is desirable that this adjustment can be performed with minimum effort. It is therefore an object of this invention to provide a windrower, the table of which is easily and quickly adjustable in height relative to the ground. This is accomplished by making the table completely independent of the main supporting frame, reel, control mechanism and driving mechanism.

By making the table independent of the main frame, the necessity for adjusting, positioning, counterbalancing, and providing flexibility in the main frame is eliminated which results in being able to make the main frame components, such as the hitch, supporting frame, reel and table supports and transporting means, into a single, rigid unit. As a result a stronger and more rigid machine can be produced without the usual very heavy and cumbersome structure. It is one object of this invention to provide such a machine which is light in weight yet exceptionally strong and rigid.

It is an object to provide a harvester in which the main frame is comprised of two sections, a hitch section and a table section, the hitch section being standard to accommodate various size table sections, thus resulting in a machine which is economical to manufacture and capable of a wide range of operations.

It is another object of this invention to provide an improved driving means for the various component parts of such a windrower.

The advantage inherent in the above stated objects and other advantages will become readily apparent as this disclosure progresses, and particularly points out the various features of this invention. Accordingly, the present invention may be considered as comprising the various constructions, combinations or sub-combinations of parts as is hereinafter more fully set forth in the detailed description and in the claims, reference being had to the accompanying drawing in which:

Figure 3 is a left side elevation view with parts broken away.

Figure 4 is a front elevational view, with certain parts removed or shown in part for sake of illustration.

Figure 5 is an enlarged fragmentary plan view of the inner tube joint and its crank arm for controlling the reel.

Figure 6 is an enlarged, fragmentary elevational view, partially in section, of the joint shown in Figure 5.

Figure 7 is an enlarged perspective view of the control quadrants for the reel and table.

Figure 8 is an enlarged perspective view of the right, rear portion of the machine.

Figure 9 is an enlarged perspective rear view of the machine showing the driving means for the sickle and canvas.

Figure 10 is an enlarged, front elevational view of the control quadrants and their connections to their respective control tubes.

Figure 1:
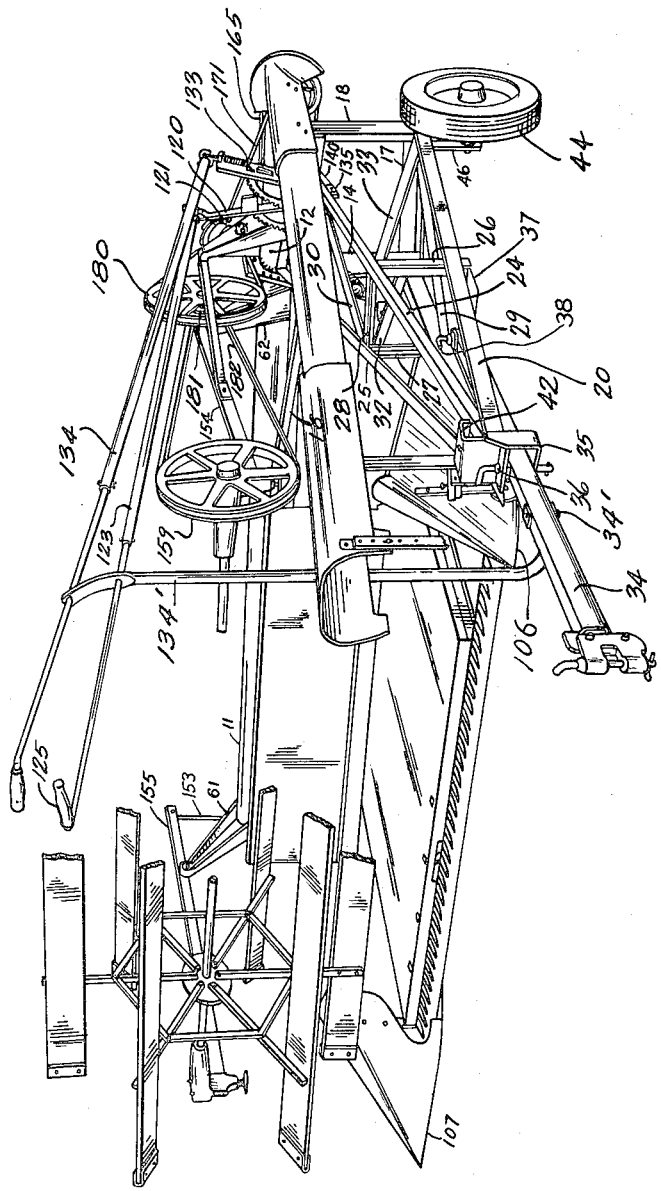
Figure 1 is a perspective view of the windrower with certain parts broken away.

This windrower is made up of two separate sections, i. e., a hitch section, which is adapted to be connected to a tractor, and a table section which extends laterally to one side of the tractor. These two sections are bolted together and the interconnecting parts are so constructed so as to permit easy assembly or disassembly.

The backbone, or primary supporting member, for this machine is of tubular construction and is comprised of two sections; a full tube member 11 for the table section, and a half tube member 12 for the hitch section. By "half tube" is meant a semi-circular in cross section member which has its open side facing downwardly. These two tube members, which form the backbone of the machine, are each welded at their inner ends to a heavy plate 13, 14. Plates 13 and 14 are in turn rigidly but detachably secured together by means of bolts 15 thus forming a single, primary tube structure. By using vertically positioned plates, considerable rigidity in a horizontal plane is obtained. The hitch section extends forwardly from the half tube member 12 and comprises a heavy angle iron 17 which is parallel to the half-tube member 12 and positioned beneath it. This angle 17 is welded at its inner end to the lower part of plate 14. The outer ends of half-tube member 12 and angle member 17 are welded to the vertically positioned channel shaped member 18. Hitch members 19 and 20 (which are of rectangular tubular cross section as best shown in Fig. 4) are welded at their rear ends to members 17 and converge at their forward ends. Bracing angle 22 extends from and is secured to the inner end of half-tube member 12 as at 23 and is secured at the other end to the forwardly extending angle member 24. Forwardly extending angle member 24 is secured at its rear end to half-tube member 12, while the forwardly extending member 25 is secured at its rear end to brace 22, both of which converge at their forward ends and are welded to tubular members 19 and 20 respectively. The longitudinally extending members 19, 20, 24, and 25 are made rigid by various interconnecting bracing members 26 to 33, inclusive. A tie bar 16 (Fig. 4) is detachably connected to the hitch section and the laterally extending table section to absorb the rearward thrust, or side draft, on the table section. The main frame structure thus described is rigid and non-positionable in respect to the ground in that it does not have to be tilted or otherwise adjustably positioned when harvesting the crop.

*Working position*

An adjustable hitch pole 34 is shown in Figures 1 and 3 in the working position and is secured to the plate 35 at the forward end of the hitch frame by means of a pin 36 which fits into mating holes in the hitch pole 34, plate 35, and bracket 42. Plate 35, bracket 42 and hitch members 19, 20, 24 and 25 are all rigidly secured together. The rear end of hitch pole 34 is secured to brace 37 by a pin 38 in either of two working positions as determined by the selection of either hole 39 in member 37.

While in the working position, this main frame is carried at the stubble end by means of carrying wheel 44 mounted on axle 45 which is supported in a wheel bracket comprising plates 46 and 47 which are welded to the transverse angle 17 and hitch member 20 respectively. The supporting means for the grain end of the main frame comprises a U-shaped axle supporting bracket 48 which has the free ends of its upstanding legs welded to the lower portion of tube member 11 and rotatably and adjustably supports post and axle 49 by means of two bearing members 50 and 51. On the lower end of post 49 is an axle portion 51 which carries the other supporting wheel 54.

*Semi-transport position*

Provision is also made for a semi-transport position, i. e., for road travel, which reduces the overall width of tractor and windrower. This position is obtained by mating the hole in the rear end of hitch pole 34 with the outer hole 39 in member 37. Member 35 is open on the grain side and when pin 36 is removed the forward end of pole 34 is free to swing inwardly until embraced by bracket 40 (Figs. 3 and 4) which is secured to hitch members 19 and 25. Pin 36 then is inserted in mating holes in pole 34 and bracket 40.

*Transport position*

When it is desired to transport the machine for any distance, or through narrow lanes or gates, a full transport position is provided which results in a very narrow overall width of tractor and windrower. In this position the windrower is pulled lengthwise directly behind the tractor. For this full transport position, the hitch pole 34 is removed from the forward part of the hitch frame entirely by simply removing pins 36 and 38 and withdrawing the pole forwardly from its supporting brackets. The hitch pole 34 is held extended from the stubble end of the frame for attachment to the tractor. For this purpose two horizontally disposed U-shaped brackets 59 and 60 (Fig. 2) are secured to the hitch frame for the reception of the hitch pole. The pole is held in the brackets 59, 60 by pins 59' (Fig. 2) and 60' (Fig. 9) respectively extending through registering holes in the pole and bracket. The bracket 59 is somewhat below the horizontal plane containing bracket 60 in order that the front end of the windrower has considerable ground clearance when the pole 34 is connected to the tractor. In transport position the main body of the windrower is directly behind the tractor.

An auxiliary post 41, shown fragmentarily in two positions in Figure 3, is carried on the hitch frame when not in use. When being used for the transport position, post 41 extends through the top of bracket 42. A horizontally disposed plate 42¹ is welded between the forward ends of members 19 and 20 and also has an opening through which the post 41 passes. A collar 43 is welded to post 41 and plate 42¹ rests thereon. The axle 45 is withdrawn from its bracket 46, 47 and is mounted in openings in the U-shaped lower portion 41' of post 41. Thus a caster wheel is provided at the forward end of the hitch frame for transport position.

The wheel 54 is turned 90 degrees from its working position to the transport position as follows: An arm 52 having an opening at the outer end is secured to post 49. The lower portion of bracket 48 has two holes therein which register with the hole in arm 52 and are held in either selected position by means of a pin 53.

*Table and reel supports*

Two rearwardly extending and transversally spaced table supporting arms 55 and 56 are welded to tube member 11 and at their free ends have bearings 57 and 58 respectively. These arms are fabricated into a channel shape which results in a lightweight yet rigid support. Also secured to tube member 11 are two upwardly and forwardly extending reel support arms 61 and 62 which are welded to tube member 11 at transversally spaced points. Adjacent to the reel arm 62 and secured to half tube member 12 is another forwardly and upwardly extending arm 63 which in conjunction with arm 62 forms a support for the reel driving mechanism. The structure described thus far forms a single and rigid main frame which carries the various component parts of the harvester such as the reel, the harvesting table, the driving means for the sickle, platform conveyor, and the reel and also carries the control mechanism for adjusting the platform and the reel, all of which are presently to be described.

*Table*

Figure 2:
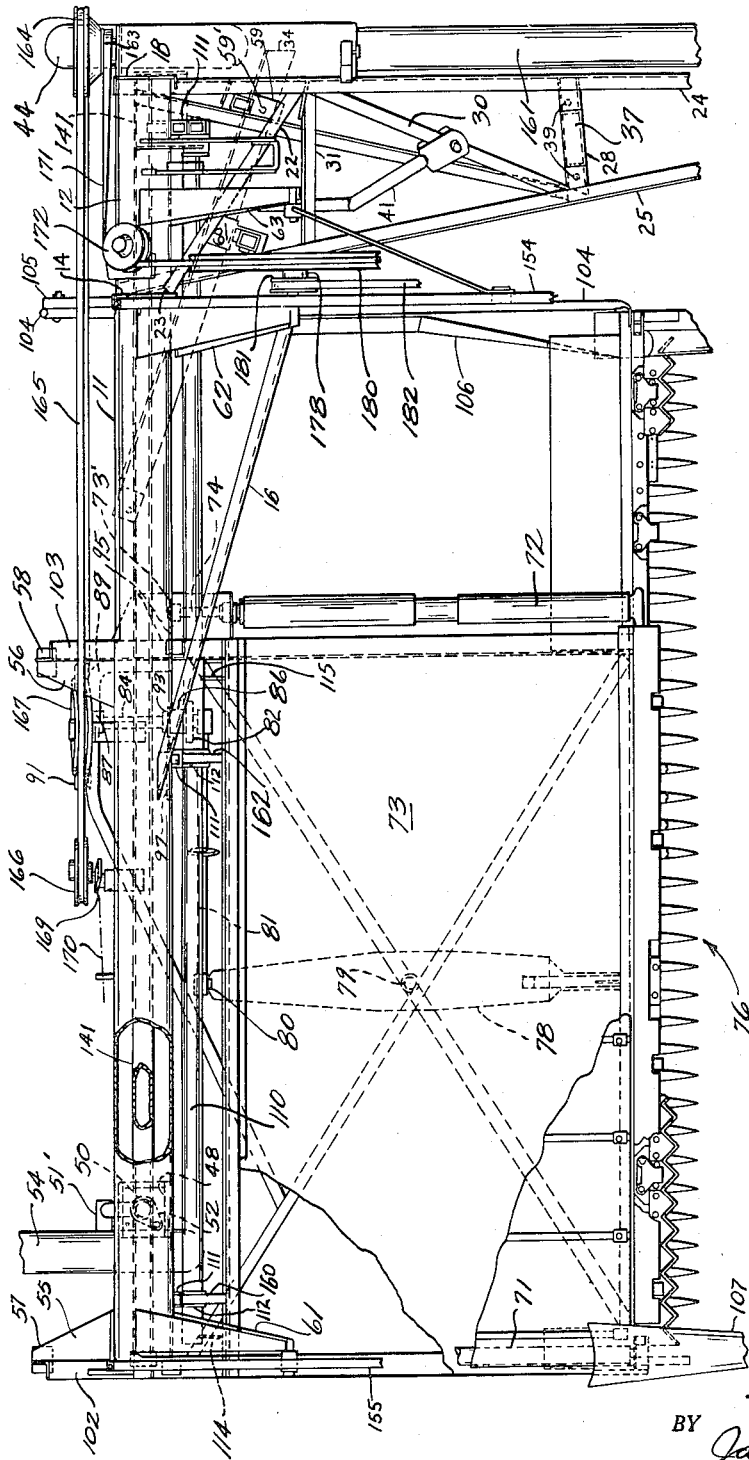
Figure 2 is a plan view with parts in section and parts broken away.

The harvester table proper comprises a generally rectangular frame 70 having the usual rollers 71, 72 rotatably mounted at the grain end and spaced a short distance from the stubble end respectively (Fig. 2) over which is trained the conventional endless conveyor 73 which discharges the crop material through the opening in the platform. The inner roller 72 has a sprocket 73¹ on the rear end of the shaft 74 on which it is mounted. The forward edge of the table carries the conventional sickle bar and guards 76. A sway bar 78 is pivotally mounted intermediate its length to the underside of the rectangular frame in line with the approximate center of the conveyor as at 79. The forward end of the sway bar 78 is pivotally connected to the sickle while the rear end is connected by a conventional ball and socket joint 80 to a rod 81 which is driven by a pitman 82 carried on one end of countershaft 84 (Fig. 9). Countershaft 84 is rotatably mounted on the frame 70 by means of suitable bearings 86, 87 the latter of which is secured to support member 89 (Fig. 2). Countershaft 84 is driven at its rear end through sheave 91 and V-belt means to be described later. A sprocket 93 (Fig. 9) is secured to shaft 84 and through a chain 95 drives the conveyor roller sprocket 73¹. Idler sprocket 97 is also mounted to the table frame by bracket 98 having a slot to allow for adjustment of the idler sprocket.

Two forwardly extending table arms 102, 103 are pivotally mounted in bearing 57, 58 on the free end of support arms 55, 56. The table, while being positioned vertically, pivots about the points 57, 58 independently of the major part of the drive mechanism and independently of the reel. Pivot points are located considerably to the rear of the swather proper and therefore the table is supported on relatively long pivot arms which serve the purpose of keeping the table relatively level at all times, provide a large amount of movement of the cutter bar for a small movement of the lift arms, and at the same time maintain a narrow table and frame structure. The table 70 is counterbalanced by means of vertically positioned springs 75, 77 (Figs. 8 and 9) which connect the arms 102, 103 respectively, to the main frame. As shown in Fig. 8, spring 75 is connected at its lower end to a stud 83 which is welded to arm 102. The upper end of the spring is adjustably connected to the arm 61 of the main frame by means of the eye bolt and nut 85 secured to stud 88 which is welded to arm 61.

The inner end of the sickle and guards is supported by a third table arm 104 which is pivotally connected to the rearwardly extending brace 105. Brace 105 is bolted or otherwise secured to the plate 14 (Fig. 9). Also secured to arm 104 is a sheet metal divider 106 for the inner end of the swath being cut. Conventional divider 107 is provided at the outer end of the table.

To accommodate the various positions of the table, relative to the main frame, the back wall is made of two overlapping sections 156, 158, best shown in Figure 8. The upper section 156 is secured to the main tube 11 by brackets 160, 162. The lower section 158 is secured to arms 102, 103 as at 168 (Fig. 8). A back wall is thus provided which is operative regardless of the relative position of table and main frame.

*Controls*

Positioning the table to meet the varying crop conditions is accomplished as follows. A secondary tube 110 is rotatably mounted to, and immediately forward of, the primary tube structure 11, 12 and extends for substantially the entire length of the harvester. Channel shaped brackets 111 are welded to the tube members 11, 12 at spaced points and bearing blocks 112 (Fig. 10) are bolted thereto. Tube 110 is rotatably mounted in the bearing blocks 112. Arms 114, 115 are welded to tube 110 and are connected to table arms 102, 103 by means of rods 116, 117 respectively (Figs. 3 and 8). Thus by rotating tube 110, by means presently to be described, the table can be adjusted vertically.

A notched quadrant 119, best shown in Figures 7 and 10, is rigidly secured to the main frame. A table operating lever 120 is welded to tube 110 and is provided with the usual spring-actuated pawl 121 adapted to engage the notched quadrant 119 for locating the lever 120 and the tube 110 in any desired position in order to fix the position of the table relative to the ground. An operator's lever 123, which is adjustable in length, extends forwardly from and is rotatably secured to the lever 120 and terminates at its forward end within easy reach of the tractor operator. By twisting the handle portion 125 the lever 123 is caused to rotate, thus oscillating a pin (not shown, but corresponding to pin 127) at the rear end of the lever 123 and thereby shifting the pawl 121 in or out of locking position. Another lever 129 is rotatably mounted on tube 110 by means of a collar 130 and it also has a similar notched quadrant 132, spring actuated pawl 133, and an operator's lever 134 with a lock releasing arrangement for the pawl as previously described. A stop lug 136 is welded to lever 120 and engages lever 129 when the table is being raised and reaches a predetermined distance from the reel. Pawl 133 has rigidly fixed thereto a pin 131$^1$ on the free end of which is rotatably mounted a roller pin 139. Pin 131$^1$ travels in the slot 131 in lever 129. A cam 137 on lever 120 contacts roller 139 and unlocks the pawl 133 from the quadrant 132 in order that continued rearward movement of lever 120 past this point will carry with it lever 129 and consequently the reel through connections to be described.

Levers 123 and 134 are rotatably mounted near their forward ends in a support 134' which is rigidly secured at its lower end to the hitch pole 34 as at 34' (Fig. 1).

Mounted within the primary tube structure 11, 12 is an inner shaft in the form of a tube 141 which is rotatably supported by bearings 142 within the tube structure 10 for oscillation therein. Inner tube 141 extends from the primary tube structure at the grain end (Fig. 8) and has rigidly secured to this protruding end an arm 143. Near the other end (under the half-tube member 12), the inner tube 141 has a joint for assembly purposes comprising a stub shaft 144 within tube 141 (Figs. 5 and 6). The stub shaft 144 is fixedly secured to the section 141' of tube 141 and detachably secured to the table section 144' of tube 141 by means of a pin or bolt 145. Making the inner tube 141 in two sections facilitates the assembly and disassembly of the main frame. Secured to the stub shaft 144 is a downwardly extending crank member 146 comprising arms 147, 148 which are welded together to form a single crank shaped member 146. The lower end of arm 147 is connected by means of a counterbalance spring 150 (Fig. 3) to the main frame as at 151. The free end of arm 148 and the free end of the corresponding arm 143, at the other end of tube 141, are linked by means of connecting rods 152, 153 respectively to reel adjusting beams 154, 155 respectively which in turn are pivotally mounted intermediate their length to the free ends of reel support brackets 62, 61 respectively. The conventional bat reel 157 is rotatably carried at the forward ends of adjusting beams 154, 155 and is driven through the V-sheave 159 secured to the end of the reel shaft.

Inner tube 141 is connected to lever 129 as follows. As previously mentioned, lever 129 is welded to collar 130 which in turn is rotatably mounted on tube 110.

Thus levers 120 and 129 both pivot about the same center. Both the tube 141 and the collar 130 have secured thereto downwardly extending arms 138 and 135 respectively which are in turn pivotally connected together by link 140.

*Driving means*

The driving means for the various operating components is as follows. The power shaft (under shield 161) is connected to the P. T. O. of the tractor and at its rear end has sheaves 163, 164 mounted for rotation therewith. Sheave 164 (Fig. 2) through V-belt 165 drives the conveyor 73 and sickle through sheave 91 mounted on shaft 84 previously mentioned. Sheaves 166, 167 are positioned between the drive sheave 164 and the driven sheave 91 and are secured to the tube member 11 by suitable brackets. The arm 169 upon which idler sheave 166 is mounted is pivoted to its bracket and is resiliently connected to the tube 11 by means of a spring 170 which keeps the V-belt taut regardless of the position of the table.

The other sheave 163 (Fig. 2) on the power shaft drives the reel through V-belt 171. A pulley 172 is adjustably secured in a slot in bracket 174 which is secured to the main frame. Another pulley 175 is adjustably mounted in a slot in the same bracket 174. Pulleys 172 and 175 serve to turn the belt 171 at right angles in driving from the driver pulley 163 on the power shaft to the sheave 180. A shaft 178 is mounted in the free end of support bracket 62, and carries sheaves 180 and 181. Sheave 180 is driven by V-belt 171 and sheave 181 drives the reel sheave 159 through V-belt 182. The driving mechanism to the reel is uninterrupted regardless of the position of the reel in relation to the main frame as the pivot center for the reel (shaft 178) and final drive belt 182 is the same.

Having thus shown and described our invention, we claim:

1. A rigid main frame structure for a windrower adapted to be moved over the ground at a constant attitude relative thereto, comprising; a forwardly extending hitch section adapted to be attached to a vehicle and having a transversely arranged backbone member, a laterally extending table section having a tubular backbone member, each section at its inner end having a vertically positioned attaching plate adapted to be rigidly and detachably secured together; an inner reel control tube rotatably mounted within and supported by said backbone members, said inner tube having a separable joint adjacent said vertical attaching plates to facilitate assembly and disassembly of said frame structure.

2. In a windrower having a rigid main frame adapted to be moved over the ground at a constant attitude relative thereto and a harvesting table pivotally secured to said main frame for independent vertical movement, said table having a canvas driving roller and a sickle and away bar opertively mounted thereon, driving means comprising; a drive sheave rotatably mounted on said main frame, a counter-shaft rotatably mounted adjacent the rear edge of said table and substantially parallel to said roller, a driven sheave secured to said shaft, a driving connection between said shaft and said roller, a pitman driving connection between said counter-shaft and sway-bar, a pair of idler sheaves rotatably mounted on said main frame, a V-belt operatively connecting said drive sheave, said driven sheave, and said idler sheaves, one of said idler sheaves being resiliently mounted on said main frame whereby said belt is kept taut regardless of the position of the table relative to said main frame.

3. A device as defined in claim 1 including, a tie bar detachably connected to said hitch section and to said table section so as to form a rigid brace between said sections and absorb side draft imposed on said table section.

4. A rigid main frame structure for a windrower adapted to be moved over the ground at a constant attitude relative thereto, comprising; a forwardly extending hitch section adapted to be attached to a vehicle and having a transversely arranged backbone member, a laterally extending table section having a tubular backbone member, each section at its inner end having a substantially vertically positioned attaching plate adapted to be rigidly and detachably secured together; an inner reel control shaft oscillatingly mounted within and supported by said backbone members, said inner shaft having a spearable joint adjacent said vertical attaching plates to facilitate assembly and disassembly of said frame structure.

References Cited in the file of this patent

UNITED STATES PATENTS

| | | |
|---|---|---|
| 2,507,719 | Kane et al. | May 16, 1950 |
| 2,532,164 | Hansen et al. | Nov. 28, 1950 |
| 2,638,728 | Balzer et al. | May 19, 1953 |
| 2,644,287 | Oberholtz | July 7, 1953 |
| 2,674,082 | Ryden | Apr. 6, 1954 |